United States Patent
Shackell

(10) Patent No.: US 11,281,683 B1
(45) Date of Patent: Mar. 22, 2022

(54) DISTRIBUTED COMPUTATION SYSTEM FOR SERVICING QUERIES USING REVISIONS MAPS

(71) Applicant: Anaplan, Inc., San Francisco, CA (US)

(72) Inventor: Thomas Francis Shackell, Leeds (GB)

(73) Assignee: Anaplan, Inc., San Francisco, CA (US)

( * ) Notice: Subject to any disclaimer, the term of this patent is extended or adjusted under 35 U.S.C. 154(b) by 544 days.

(21) Appl. No.: 16/176,522

(22) Filed: Oct. 31, 2018

(51) Int. Cl.
*G06F 16/2458* (2019.01)
*G06F 16/21* (2019.01)
*G06F 16/901* (2019.01)

(52) U.S. Cl.
CPC ........ *G06F 16/2474* (2019.01); *G06F 16/219* (2019.01); *G06F 16/2471* (2019.01); *G06F 16/9024* (2019.01)

(58) Field of Classification Search
None
See application file for complete search history.

(56) References Cited

U.S. PATENT DOCUMENTS

| | | | |
|---|---|---|---|
| 6,212,515 B1 | 4/2001 | Rogers | |
| 6,381,605 B1 | 4/2002 | Kothuri | |
| 6,920,454 B1 | 7/2005 | Chan | |
| 7,941,408 B2 | 5/2011 | Sinha | |
| 7,958,457 B1 | 6/2011 | Brandenberg et al. | |
| 8,151,056 B2 | 4/2012 | Gould | |
| 8,589,445 B2 | 11/2013 | Gould | |
| 9,411,853 B1 | 8/2016 | Dovrtel et al. | |
| 9,529,892 B2 | 12/2016 | Tibrewal | |
| 9,552,242 B1 | 1/2017 | Leshinsky et al. | |
| 9,710,501 B2 | 7/2017 | Walker | |
| 10,298,661 B2 | 5/2019 | Harries | |
| 10,803,064 B1 | 10/2020 | Sanders et al. | |
| 10,929,428 B1 | 2/2021 | Brahmadesam et al. | |
| 2003/0009458 A1* | 1/2003 | Nakano | G06F 16/00 |
| 2003/0009551 A1 | 1/2003 | Benfield et al. | |
| 2003/0009552 A1 | 1/2003 | Benfield et al. | |

(Continued)

OTHER PUBLICATIONS

International Search Report and Written Opinion dated Dec. 8, 2020, for PCT/US2020/054157 filed on Oct. 2, 2020.

(Continued)

*Primary Examiner* — Pierre M Vital
*Assistant Examiner* — Andalib F Lodhi
(74) *Attorney, Agent, or Firm* — Chamberlain, Hrdlicka, White, Williams & Aughtry

(57) ABSTRACT

In general, the invention relates to a method for servicing query requests. The method includes determining, by a first query node and in response to a first query request, a user data sub-region and a target sub-region associated with the first query request. The further includes identifying a first input sub-region of the target sub-region using a data flow graph, identifying a second query node associated with the first input sub-region, and issuing a second query request to the second query node to obtain data associated with the first input sub-region. The method further includes receiving, in response to the second query request, a second query result from the second query node, generating a first query result for the target sub-region using at least the second query result, and providing the first query result to an entity associated with the issuance of the first query request.

15 Claims, 11 Drawing Sheets

(56) References Cited

U.S. PATENT DOCUMENTS

| | | |
|---|---|---|
| 2004/0210608 A1 | 10/2004 | Lee et al. |
| 2005/0005116 A1 | 1/2005 | Kasi et al. |
| 2005/0120062 A1 | 6/2005 | Sinha |
| 2006/0184519 A1 | 8/2006 | Smartt |
| 2009/0055266 A1 | 2/2009 | Brody et al. |
| 2009/0249290 A1 | 10/2009 | Jenkins |
| 2010/0009661 A1 | 1/2010 | Zhu |
| 2010/0100571 A1 | 4/2010 | Gould |
| 2010/0131715 A1 | 5/2010 | Gould |
| 2011/0047146 A1 | 2/2011 | Scott |
| 2011/0264679 A1* | 10/2011 | Dettinger ............ G06F 16/2471 707/765 |
| 2011/0293096 A1 | 12/2011 | Reilly |
| 2012/0198198 A1 | 8/2012 | Gould |
| 2012/0290700 A1 | 11/2012 | Li et al. |
| 2013/0110911 A1 | 5/2013 | Chow |
| 2013/0117257 A1* | 5/2013 | Meijer ................ G06F 16/2453 707/719 |
| 2013/0311422 A1 | 11/2013 | Walker |
| 2014/0032504 A1 | 1/2014 | Golab et al. |
| 2014/0156638 A1 | 6/2014 | Joshi |
| 2014/0180653 A1 | 6/2014 | Belmans |
| 2014/0215019 A1 | 7/2014 | Ahrens |
| 2014/0304339 A1 | 10/2014 | Hamilton |
| 2014/0365523 A1 | 12/2014 | Wagner |
| 2015/0012539 A1* | 1/2015 | Mchugh ............... G06F 16/2255 707/737 |
| 2015/0067556 A1 | 3/2015 | Tibrewal |
| 2015/0100574 A1 | 4/2015 | Presta et al. |
| 2015/0149570 A1 | 5/2015 | Harries et al. |
| 2015/0347450 A1 | 12/2015 | Phelan |
| 2016/0019275 A1 | 1/2016 | Mosko |
| 2016/0050269 A1 | 2/2016 | Botticelli |
| 2016/0085809 A1 | 3/2016 | De Castro Alves |
| 2016/0124857 A1 | 5/2016 | Parr |
| 2016/0321376 A1 | 11/2016 | Taylor |
| 2016/0350363 A1 | 12/2016 | Raja et al. |
| 2017/0012815 A1 | 1/2017 | Nekrestyanov et al. |
| 2017/0024912 A1 | 1/2017 | De Castro Alves |
| 2017/0255524 A1 | 9/2017 | Mcgrath |
| 2018/0088788 A1* | 3/2018 | Cheung ............... G06F 3/04855 |
| 2018/0096027 A1 | 4/2018 | Romero et al. |
| 2018/0173767 A1 | 6/2018 | Langseth et al. |
| 2018/0232422 A1 | 8/2018 | Park |
| 2018/0246926 A1 | 8/2018 | Altaf |
| 2018/0260409 A1 | 9/2018 | Sundar |
| 2018/0300350 A1 | 10/2018 | Mainali |
| 2019/0147078 A1 | 5/2019 | Dageville |
| 2019/0236130 A1 | 8/2019 | Li et al. |
| 2019/0236215 A1 | 8/2019 | Agarwal et al. |
| 2019/0294724 A1 | 9/2019 | Michelis |
| 2019/0325737 A1 | 10/2019 | Moustafa et al. |
| 2020/0104181 A1 | 4/2020 | Pyati et al. |
| 2020/0104362 A1 | 4/2020 | Yang et al. |
| 2020/0151577 A1 | 5/2020 | Ogawa |
| 2021/0011914 A1 | 1/2021 | Pearson et al. |

OTHER PUBLICATIONS

International Search Report and Written Opinion issued in corresponding application No. PCTUS2019059235, dated Feb. 4, 2020. (15 pages).

Lars George, HBase: The Definitive Guide, HBase: The Definitive Guide, Sep. 23, 2011, 1-524, ISBN: 978-1-4493-9610-7, O'Reilly Media, Incorporated, Sebastopol, XP055662278 (115 pages).

Silu Huang et al, OrpheusDB: Bolt-on Versioning for Relational Databases, OrpheusDB: Bolt-on Versioning for Relational Databases, Mar. 7, 2017, rxiv.org, Cornell University Library, 2010 Lin Library Cornell University Ithaca, NY 14853, DOI: 10.14778/3115404.3115417, Cornell University Library, 2010 Lin Library Cornell University, NY 14853 (63 pages).

* cited by examiner

DISTRIBUTED COMPUTATION SYSTEM FOR SERVICING QUERIES USING REVISIONS MAPS

BACKGROUND

Companies collect large amounts of data about their own operations. This data is then analyzed to determine, among other things, how to improve the operation of the company and/or how to plan for the future operation of the company. The traditional approach to efficiently analyzing data (or data sets) is to load the data (or data sets) into memory and then analyze the in-memory data. As the size of data sets that need to be analyzed has grown, the traditional approach has become impractical or at a minimum cost prohibitive. Specifically, in order to keep all of the data in memory, a larger amount of memory needs to be provisioned and additional overhead needs to be expended in order to ensure that the data in the memory is current. Further, as the size of the data set increases, it is difficult to efficiently and effectively scale the hardware and software infrastructure necessary to analyze the larger data set.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

SUMMARY

Figure 1A:
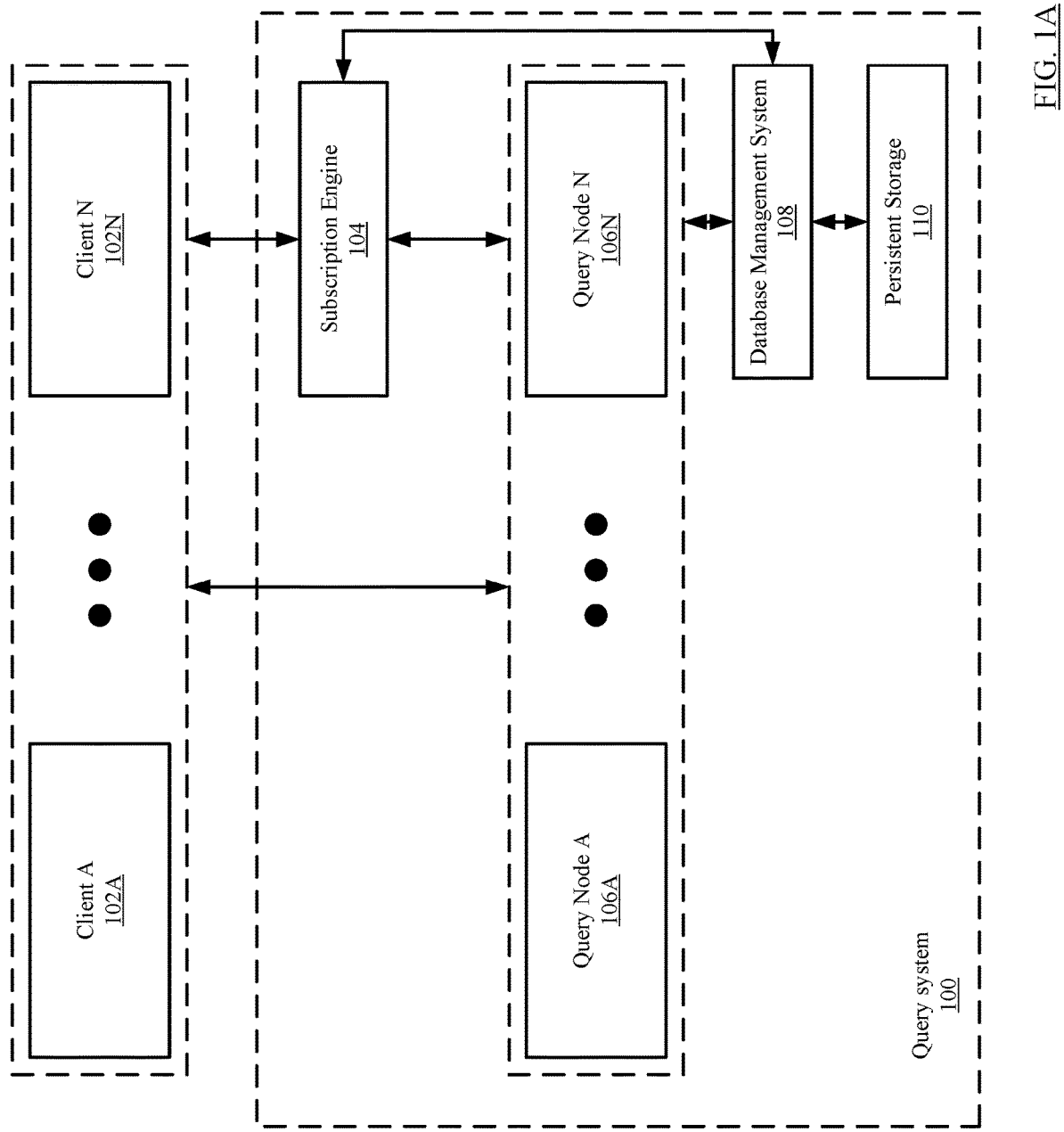
FIG. 1A shows a diagram of a system in accordance with one or more embodiments of the invention.

In general, in one aspect, the invention relates to a method for servicing query requests. The method includes determining, by a first query node and in response to a first query request, a user data sub-region and a target sub-region associated with the first query request, identifying, using a data flow graph, a first input sub-region of the target sub-region, identifying a second query node associated with the first input sub-region, issuing a second query request to the second query node to obtain data associated with the first input sub-region, receiving, in response to the second query request, a second query result from the second query node, generating a first query result for the target sub-region using at least the second query result, and providing the first query result to an entity associated with the issuance of the first query request.

In general, in one aspect, the invention relates to a non-transitory computer readable medium comprising computer readable program code, which when executed by a computer processor enables the computer processor to perform a method for servicing query requests, the method comprising determining, by a first query node and in response to a first query request, a user data sub-region and a target sub-region associated with the first query request, identifying, using a data flow graph, a first input sub-region of the target sub-region, identifying a second query node associated with the first input sub-region, issuing a second query request to the second query node to obtain data associated with the first input sub-region, receiving, in response to the second query request, a second query result from the second query node, generating a first query result for the target sub-region using at least the second query result, and providing the first query result to an entity associated with the issuance of the first query request.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for performing distributed calculations. More specifically, embodiments of the invention relate to distributing management of the data to be analyzed across query nodes and also distributing the servicing of a query request across one or more query nodes.

FIG. 1A shows a diagram of a system in accordance with one or more embodiments of the invention. The system includes a query system (100) interacting with one or more clients (102A, 102N). The components illustrated in FIG. 1A may be connected via any number of operable connections supported by any combination of wired and/or wireless networks. Each component of the system of FIG. 1A (including the individual components in the query system) may be operably connected via any combination of wired and/or wireless connections. Each component of the system of FIG. 1A is discussed below.

In one embodiment of the invention, clients (102A, 120N) are configured to issue query request to the query system (or to a specific query node in the query system), to receive query responses, and to interact with the subscription engine (described below).

In one or more embodiments of the invention, zero, one or more clients (102A, 102N) are implemented as computing devices. The computing devices may be, for example, mobile phones, tablet computers, laptop computers, desktop computers, servers, distributed computing systems, or cloud resources. Each computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to issue one or more query requests and to receive one or more query responses as described throughout this application. For additional details regarding computing devices, refer to FIG. 5.

In one or more embodiments of the invention, the zero, one or more clients (102A, 102N) are implemented as logical devices. Each of the logical devices may utilize the computing resources of any number of computing devices and thereby provide the functionality to issue one or more query requests and to receive one more query responses as described throughout this application. Examples of logical devices may include, but are not limited to, virtual machines and containers.

In one or more embodiments of the invention, query system (100) includes one or more query nodes (106A, 106N), a database management system (DBMS) (108), persistent storage (110), and a subscription engine (104). Each of these components is described below.

Figure 1B:
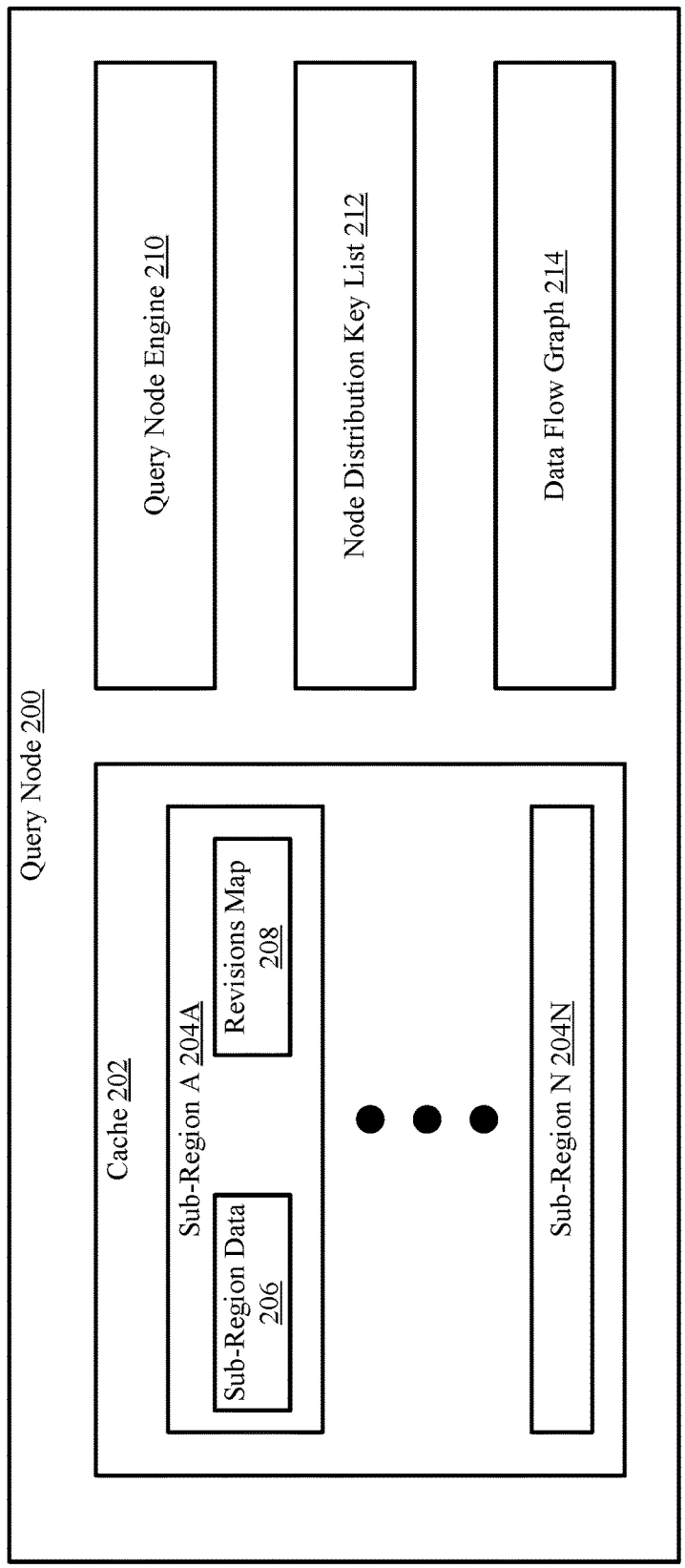
FIG. 1B shows a diagram of a query node in accordance with one or more embodiments of the invention.
Figure 1C:
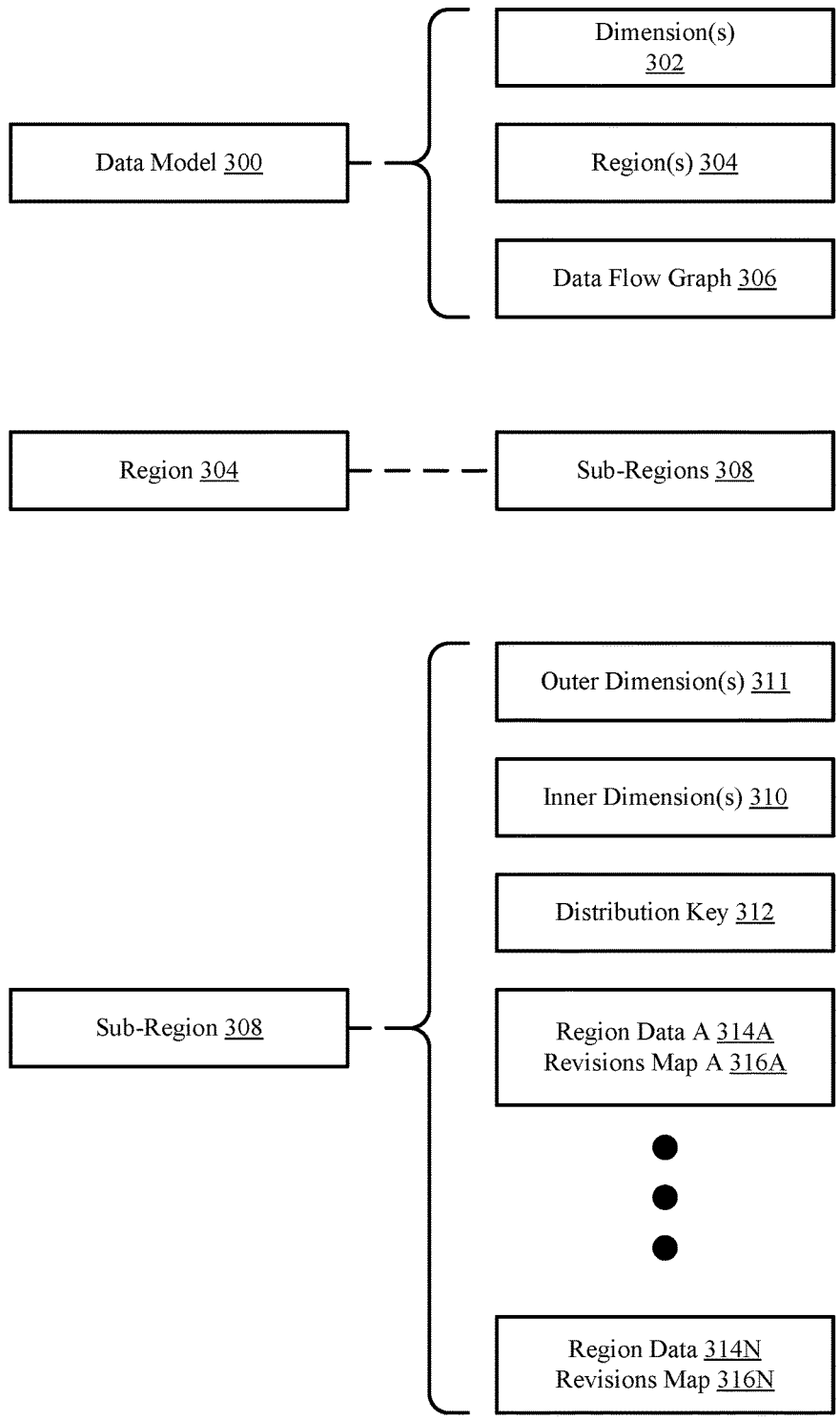
FIG. 1C shows relationships between various elements in the system in accordance with one or more embodiments of the invention.
Figure 2:
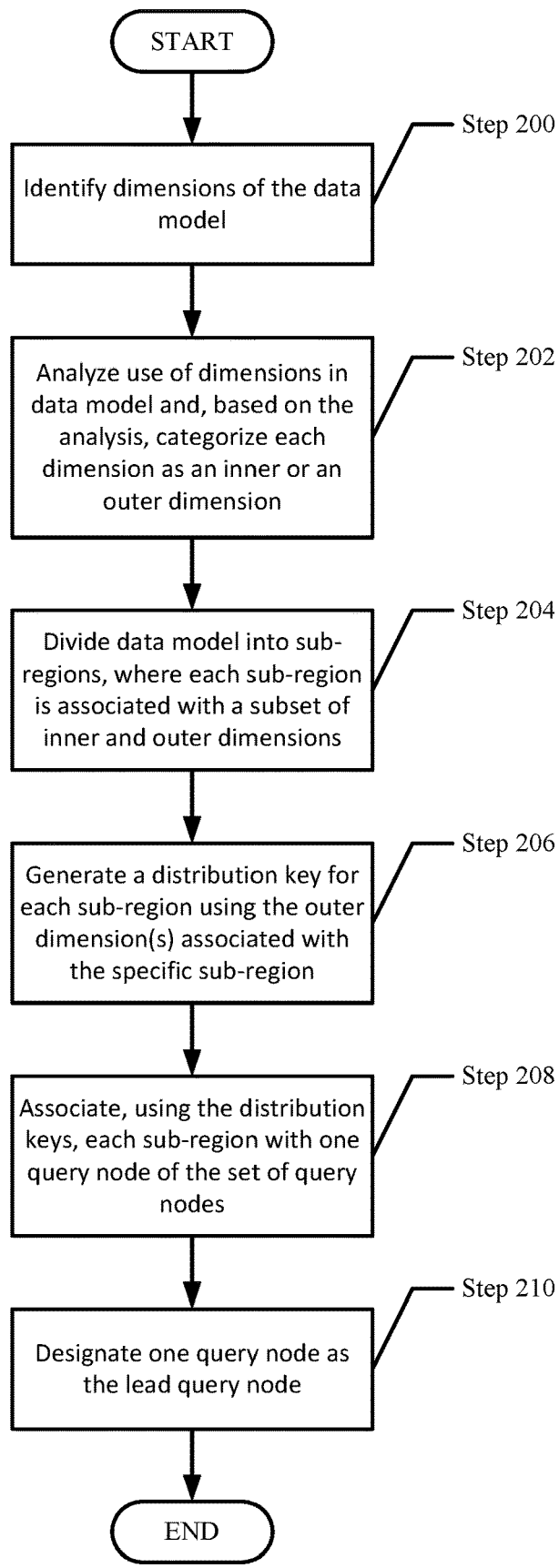
FIG. 2 shows a flowchart of a method of configuring the system in accordance with one or more embodiments of the invention.

In one or more embodiments of the invention, each query node (106A, 106N) may be configured to perform all or a portion of the method shown in FIG. 2 in order to configure the query system to service query requested. Further, each query node (106A, 106N) may also be configured to service query requests that may originate from a client (102A, 102N), from the subscription engine (104), and/or for another query node (106A, 106N). Servicing the query requests by the query nodes may be performed recursively in accordance with FIGS. 3A-3C. In addition, each of the query nodes may include functionality to be designated as the lead query node and, when it is designated as such, manage the distribution of sub-regions among the query nodes. Additional detail about the distribution of sub-regions is provided below in, e.g., FIGS. 1B, 1C, and 2.

In one or more embodiments of the invention, zero, one or more query nodes (106A, 106N) are implemented as computing devices. The computing devices may be, for example, mobile phones, tablet computers, laptop computers, desktop computers, servers, distributed computing systems, or cloud resources. Each computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to issue one or more query requests and to receive one or more query responses as described throughout this application. For additional details regarding computing devices, refer to FIG. 5.

In one or more embodiments of the invention, the zero, one or more query nodes (106A, 106N) are implemented as logical devices. Each of the logical devices may utilize the computing resources of any number of computing devices and thereby provide the functionality to issue one or more query requests and to receive one more query responses as described throughout this application. Examples of logical devices may include, but are not limited to, virtual machines and containers.

Additional details about the query nodes are provided in FIGS. 1B and 2-3C below.

In one embodiment of the invention, the database management system (DBMS) (108) provides an interface between other components of the query system (e.g., the query nodes, and the subscription engine) and the persistent storage. More specifically, DBMS (108) is configured to receive requests for data stored in the persistent storage, retrieve the requested data from the persistent storage, and provide the retrieved data to the requesting entity (e.g., a query node). In various embodiments of the invention, the DBMS is also configured to store data (which may be user data or derived data) in the persistent storage and, in certain scenarios, issue notifications to the subscription engine (104) when particular user data is stored in the persistent storage or a request is made to store user data in the persistent storage (additional detail described below). The DBMS (108) may be implemented using any protocol currently known or later developed. Those skilled in the art will appreciate that management software, other than a DBMS may be used without departing from the invention. In one embodiment of the invention, the DBMS may be implemented on a computing device (see e.g., FIG. 5) or as a logical device (e.g., a virtual machine, a container, etc.).

In one embodiment of the invention, the persistent storage (110) includes any form of non-volatile storage media that may store data (e.g., user data and derived data). Examples of persistent storage may include, but are not limited to, magnetic storage, optical storage, solid state memory, or any combination thereof. In one embodiment of the invention, the data stored in persistent storage may be user data and derived data. Depending on the implementation of the invention, the persistent storage may store the user data and not store the derived data.

In one embodiments of the invention, data is denoted as user data when the data is input by the user, obtained from a user, and/or obtained from a data source specified by the user. Further, in one embodiment of the invention, the data is denoted as derived data if the data is generated (e.g., by applying a function or an algorithm) to user data, other derived data, or any combination thereof.

Each piece of data stored in the persistent storage is associated with a sub-region. Further, each piece of data or sub-region may be associated with a version(s). If the data is user data or if the sub-region is a user data sub-region (i.e., a sub-region that only includes user data), then the version (which may be represented as a number) corresponds to the version of the data. The version may be referred to as a revisions map. The initial version of the user data or user data sub-region is, e.g., one and each time there is any change to the user data or the user data sub-region (e.g., an addition, deletion, or modification), then an updated copy of the user data or user data sub-region is stored and the version associated with the updated copy of the user data or user data sub-region is incremented (or updated). In this manner, the persistent storage may include multiple copies of a particular piece of user data or particular user data sub-region each associated with their own version number.

If the data is derived data or if the sub-region is a derived data sub-region (i.e., a sub-region that only includes derived data), then the version (which may be represented as a number) corresponds to the version(s) of the user data that was used to generate (directly or indirectly) the derived data or derived data sub-region. The version or versions of user data from which the derived data is directly or indirectly derived may be referred to as a revisions map. The initial version of the derived data or derived data sub-region is, e.g., one and each time the derived data is recalculated, then the resulting derived data or derived data sub-region is stored and the version(s) of the underlying user data are recorded. In this manner, the persistent storage may include multiple copies of a particular piece of derived data or particular derived sub-region each associated with their own version number. For example, consider a scenario in which, at a first time, derived data (DD1) is calculated using user data A version 1 (UDAv1) and user data B version 2 (UDBv2). Accordingly, the persistent storage stores DD1 along with the following revisions map: [UDAv1, USBv2]. At a second point in time, user data B is updated resulting user data B version 3 being stored in the persistent storage. At a third point in time, the derived data is recalculated (e.g., in response to a query request) the resulting derived data (DD2) may be stored in persistent storage along with the following revisions map: [UDAv1, UDv3]. The example is not intended to limit the scope of the invention.

Continuing with the discussion of FIG. 1A, in one embodiment of the invention, the subscription engine (104) is configured to receive requests from the clients (102A, 102B) to issue query requests when there is a change to the user data associated with the query request. More specifically, each query request is associated target sub-region (e.g., the specific data that is responsive the query request) and each target sub-region is associated (directly or indirectly) with user data. When there is a change to such user data, the subscription engine may initiate the corresponding query request. For each query request that the subscription engine is monitoring, the subscription engine monitors the user data associated with the query request. In one or more embodiments of the invention, monitoring the user data may include receiving a notification from the DBMS (108) each time any user data has changed. In such scenarios, the subscription engine may process each notification to determine whether the user data that has change is associated with any of the query requests that it is monitoring. If user data is associated with one or more query requests, then the subscription engine either: (i) issues the query request to the query system (e.g., to a query node), receives a query result and then provides the query result to the appropriate client(s) (or instructs the query system to send the query result directly to the appropriate client), or (ii) notifies the appropriate client(s) (i.e., the client(s) that requested that the subscription engine monitor the query request), where the client(s) subsequently issues the appropriate query request to the query node.

In another scenario, the subscription engine (104) may, for each query request it is monitoring, specify to the DBMS (108) which user data sub-regions (i.e., sub-regions with user data) to monitor. In this scenario, the DBMS may only notify the subscription engine of user data changes to the user data sub-regions specified by the subscription engine. When a notification is received by the DBMS (108), the subscription engine may be process each notification to determine associated query request(s). Once the associated query request(s) is identified, then the subscription engine either: (i) issues the query request to the query system (e.g., to a query node), receives a query result, and provides the query result to the appropriate client(s) (or instructs the query system to send the query result directly to the appropriate client), or (ii) notifies the appropriate client(s) (i.e., the client(s) that requested that the subscription engine monitor the query request), where the client(s) subsequently issues the appropriate query request to the query node.

In one embodiment of the invention, the subscription engine may be implemented on a computing device (see e.g., FIG. 5) or as a logical device (e.g., a virtual machine, a container, etc.).

FIG. 1B shows a diagram of a query node in accordance with one or more embodiments of the invention. In one embodiment of the invention, the query node (200) includes a cache (202), a query node engine (210), a node distribution key list (212), and a data flow graph (214). Each of these components is described below.

In one embodiment of the invention, the cache (202) is volatile memory (e.g., random access memory) that stores data associated with one or more sub-regions (204A, 204N). More specifically, data stored in the cache that is associated with a sub-region (i.e., sub-region data (206)) may be user data or derived data. Further, the sub-region data (206) is associated with a revisions map (208). More specifically, each piece of data (user data or derived data) is associated with a sub-region and a revisions map (208) (or a relevant portion thereof, see e.g., FIGS. 4A-C) (as described above in FIG. 1A). Accordingly, for a given piece of data or sub-region, there may be multiple different versions each associated with their own unique revisions map. Additional detail about sub-regions is provided below in FIG. 1C. The manner in which data is stored in the cache and the manner in which data is removed and/or added to the cache may vary based on the implementation of the invention. Further, the mechanism used to manage a cache on a given query node may be the same or different than the mechanism used to manage the cache on a different query node. Moreover, the caching used in the query system does not require the caches on the query nodes to be consistent and/or coherent.

Figure 3A:
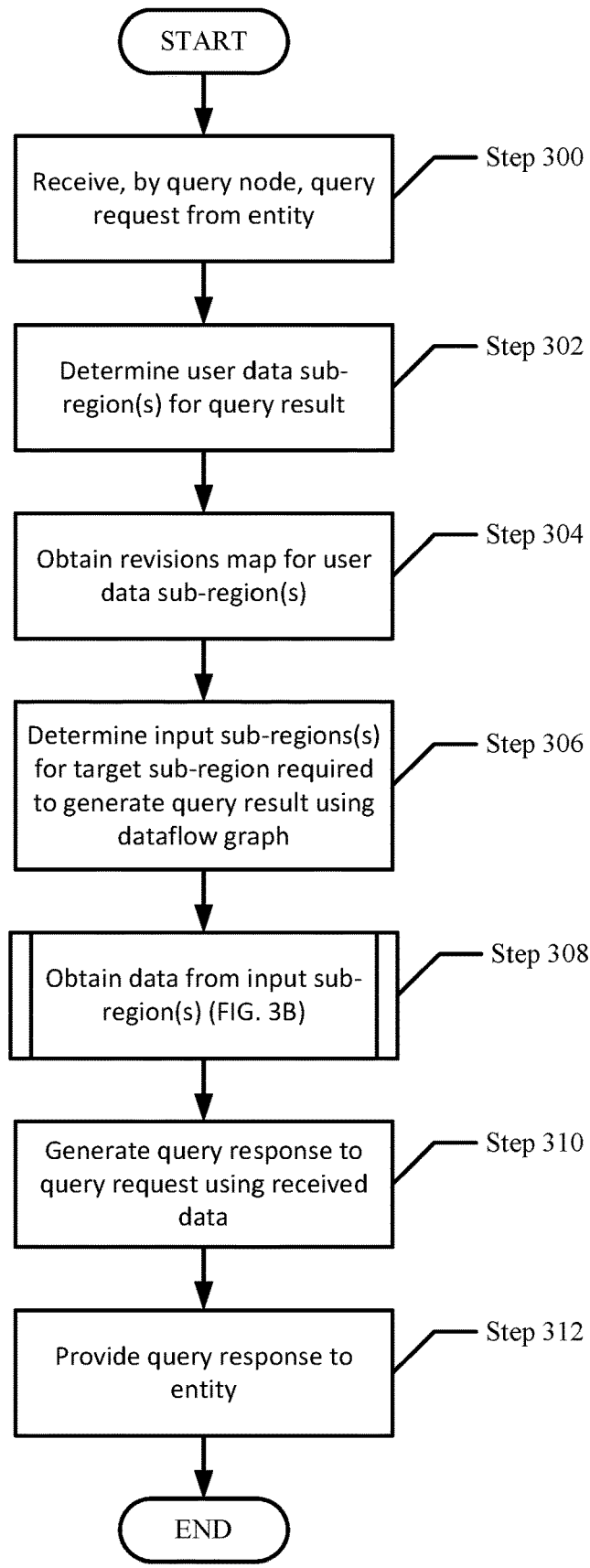
FIGS. 3A-3C show flowcharts for servicing a query request from a client in accordance with one or more embodiments of the invention.
Figure 3B:
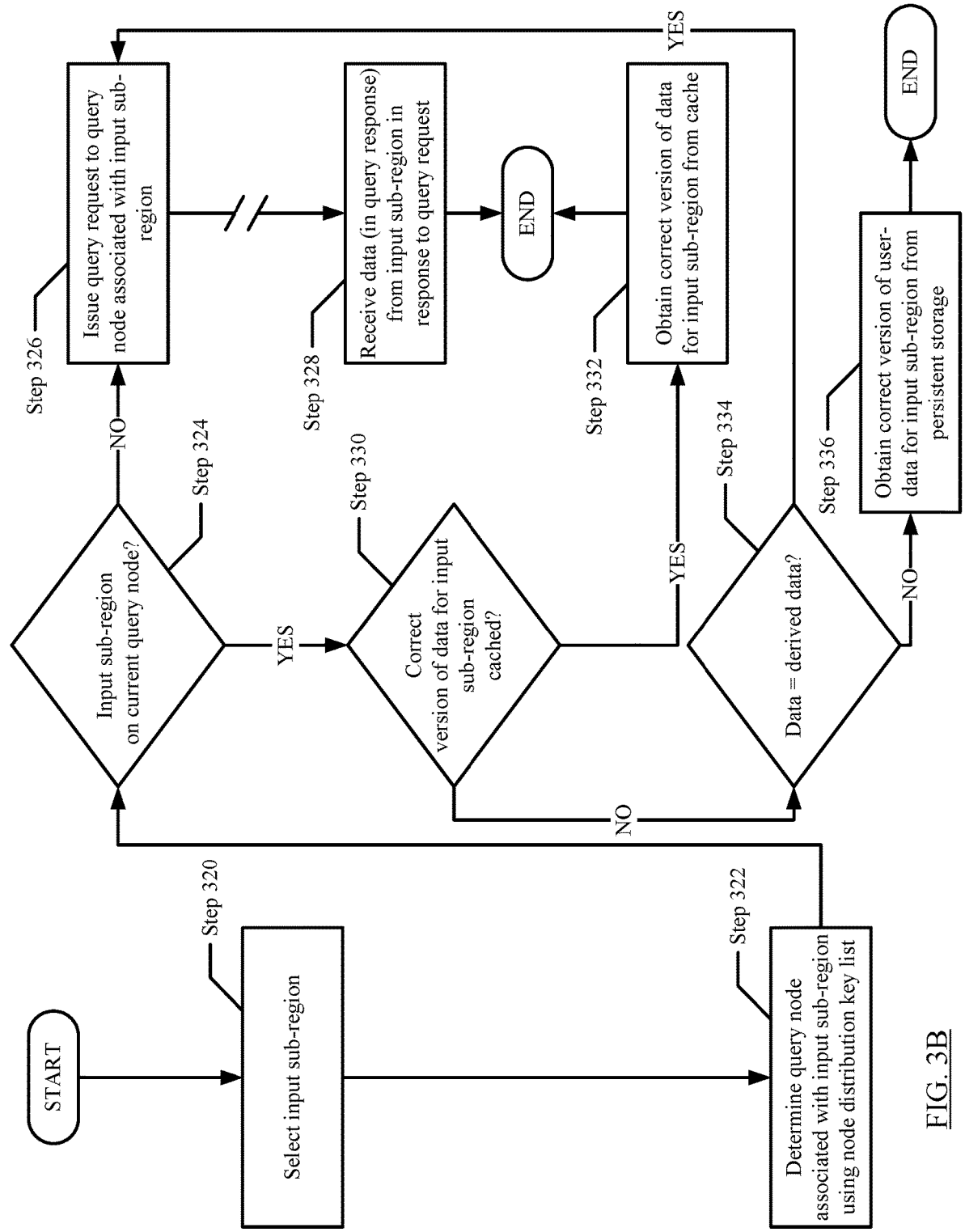
Figure 3C:
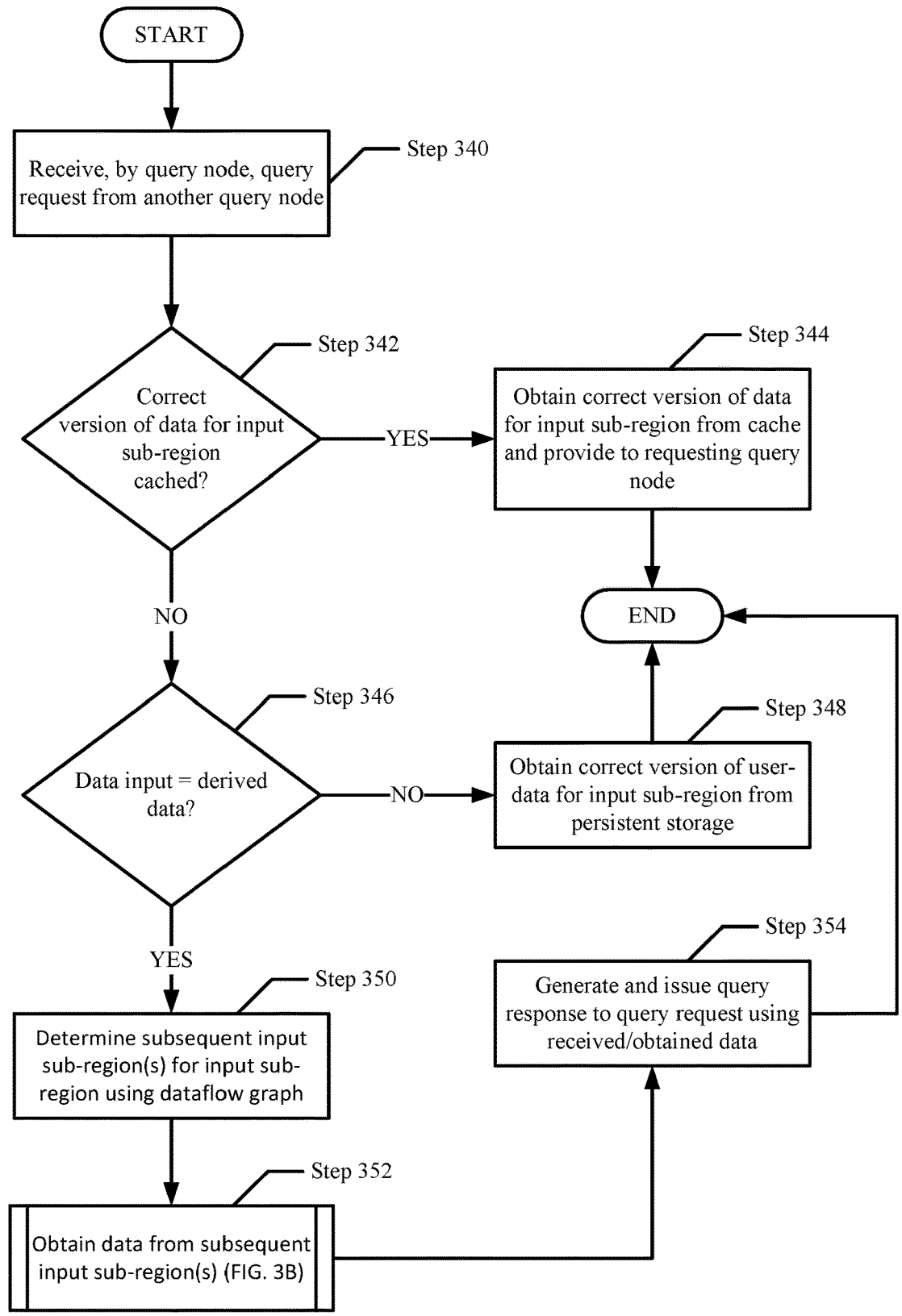

In one embodiment of the invention, the query node engine (210) is configured to perform all or a portion of the functionality described in FIGS. 2-3C.

In one embodiment of the invention, the node distribution key list (212) specifies a list of node distribution keys associated with each query node in the query system. The generation, operation, and use of the distribution key and the node distribution key list are described below with respect to FIGS. 2-3C.

In one embodiment of the invention, the data flow graph (214) specifies the relationships between the regions and/or sub-regions (where the specific granularity of the data flow graph may vary based on the implementation of the invention). More specifically, in one embodiment of the invention, the data is stored in the query system based on a data model. The data model may specify, among other information, what data is stored and the relationships between the stored data. Additional details about the data flow graph and the data model is described in FIG. 1C.

FIG. 1C shows relationships between various elements in the system in accordance with one or more embodiments of the invention.

As discussed above, the data is stored in the query system in accordance with a data model (300). In one embodiment of the invention, data is stored in cells, where each cell is associated one or more dimensions (302). The dimensions are specified by the data model (300) and define what specific data is stored within a given cell. Each of the cells is associated with a region (304), where the data model may specify multiple regions (304). Said another way, the data stored in accordance with the data model may be grouped into regions (304), where each region includes multiple cells. Further, the relationship between the regions (or sub-regions) is specified using a data flow graph (306). The data flow graph may specify whether a given cell includes user data or derived data. If a given cell includes derived data, the data flow graph may specify: (i) what user data and/or derived data are inputs to the particular cell (i.e., are input to generating the derived data of the cell) and (ii) the function (which may be mathematical function or algorithm) is used to combine the aforementioned inputs. An example of a data flow graph in shown in FIG. 4B.

Each region (304) may be divided into two or more sub-regions (308). Each sub-region for a given region may have the same outer dimension(s) but different inner dimensions. For example, consider a scenario in which a given region is associated with a time dimension (specified as months of the year) and a geographic location dimension, which specifies North America, South America, Europe, Asia, Africa, and Australia. In this example, the outer dimension is time and the inner dimension is geographic location. Accordingly, if the region was to be divided into sub-regions, then each sub-region would be associated with a same time dimension but a different geographic location (e.g., North America, South America, Europe, Asia, Africa, or Australia).

Continuing with the discussion of FIG. 1C, each sub-region (308) is associated with one or more outer dimensions (302), one or more inner dimensions (304), a distribution key (312), and one or more sets of data (referred to as sub-region data) (314A, 314N), where the data is associated with corresponding revisions map (316A, 316N) (as described above). Additional detail about the designation of a dimension as an inner or outer dimension is provided in FIG. 2. In one embodiment of the invention, the distribution key (312) is generated by applying a function to at least one outer dimension associated with the sub-region. The function may be, for example, a consistent hashing function. The use of the distribution key is described below in FIGS. 2-3C.

While the system of FIGS. 1A-1C has been illustrated as including a limited number of components for the sake of brevity, the system may include additional components (not shown), fewer components, and/or different components (not shown) without departing from the invention.

FIGS. 2-3C show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2-3C may be performed in parallel with any other steps shown in FIGS. 2-3C without departing from the scope of the invention.

FIG. 2 shows a flowchart of a method of configuring the system in accordance with one or more embodiments of the invention. All or a portion of the method shown in FIG. 2 may be performed by one or more of the query nodes and/or another computing device or logical device that is external to the query system.

Turning to FIG. 2, prior to step 200, a data model has been obtained and/or specified. Details about the data model are provided above with respect to FIG. 1C.

In Step 200, the dimensions of the data model are identified. As discussed above, each region is associated with one or more dimensions. Each dimension may specify an item, measure, or characteristic of data that can be obtained, calculated or manipulated. Examples of dimensions may include, but are not limited to, geographic location, time, organization, users, versions, etc. The dimensions may correspond to default dimensions specified by the query system (or by another system or entity) and/or dimensions that are created by users.

In Step 202, the dimensions for the data model are analyzed in order to categorize the dimensions as outer dimensions and inner dimensions. The analysis may include using the data flow graph and the data model to determine the dimensions associated with region and how data from one region impacts data in another region(s). While the query requests may be processed using a combination of query nodes (see e.g., FIGS. 3A-3C), the query results may be obtained in a more efficient manner if there is less inter-query node communication (i.e., there are fewer query requests issued between the query nodes). Based on the analysis of the data model and the data flow diagram, the dimensions may be categorized in a manner that minimizes or attempts to minimize the inter-query node communication.

Specifically, in one embodiment of the invention, the distribution of sub-regions across the query nodes is based on the outer dimension(s) of the sub-regions. In such implementations, all sub-regions that are associated with the same outer dimension(s) are located on the same query node. Accordingly, based on the data model and the data flow graph, the outer dimension may be specified such that directly related sub-regions (e.g., sub-regions that are connected by an edge in the data flow graph, see e.g., FIG. 4B, sub-region A and sub-region B) are located on the same query node.

Other heuristics and/or analysis may be performed to categorize the dimensions as inner dimensions and outer dimensions without departing from the invention.

Continuing with the discussion of FIG. 2, in Step 204, the data model is divided into sub-regions, where each sub-region is associated with at least one outer dimension and at least one inner dimension. For each sub-region, the value of outer dimension(s) is constant while the inner dimension(s) may vary. For example, if the data model includes the following dimensions: geographic location and time. Based on the analysis in step 202, time may be specified as an inner dimension and geographic location may be specified as an outer dimension. In this example, each sub-region may be associated with a specific value for the outer dimension e.g., North America, South America, Africa, Asia, Europe, or Australia, but be associated with varying values for a time dimension. Accordingly, if sub-region A is associated with an outer dimension of Africa, then all data in this sub-region is associated with the geographic location of Africa but with different time periods (e.g., January, February, March, etc.). Those skilled in the art will appreciate that the invention is not limited to the aforementioned example.

Continuing with the discussion of FIG. 2, in Step 206, a distribution key is generated for each sub-region (i.e., the sub-regions resulting from Step 204). Each distribution key may be generated using a function, such as, a consistent hashing function with the outer dimension(s) of the sub-regions being used as an input(s) to the function. By using the outer dimension(s) of the sub-regions as the input(s) to the function, all sub-regions with the same outer dimension(s) will have the same value for their distribution key.

In Step 208, each of the distribution keys is associated with one of the query nodes. The distribution keys may be spread symmetrically or asymmetrically across the query nodes in order to balance the load of process query requests across the query system. Any known method or later discovered method may be used to associate keys to particular query nodes without departing from the invention. The result of the process in step 208 is a global distribution key list. This global distribution key list specifies which distribution keys are associated with which query nodes.

In Step 210, one of the query nodes in the query system is designated as the lead query node. The query node, in various implementations of the invention, may include functionality to: (i) send to all query nodes in the query system (or at least to the query nodes that are specified in the global distribution key list) the global distribution key list; (ii) update the global distribution key list during the operation of the query system to account for changes in the loads experienced by the various query nodes and/or to address issues (e.g., failures or degraded operation) of one or more of the query nodes and (iii) to propagate updates of the global distribution key list to the various non-leader query nodes. For purposes of this disclosure, each query node maintains its own distribution key list (referred to as a node distribution key list), which is intended to be the same as the global distribution key list; however, due to potential latency issues in the propagation of updates to the global distribution key list, the node distribution key list on a given query node may be inconsistent (for at least period of time) with the global distribution key list. By using the node distribution key lists and maintaining redundant copies of the node distribution key list, the query system is not limited to all query nodes attempting to access a single copy of the node distribution key list, thereby making the query system fault tolerant. Specifically, if the lead query node fails or becomes unavailable, the query system will continue to operate by (i) designating a new lead query node and (ii) updating the global distribution key list to move all sub-regions that were previously managed by the failed query node to other active query nodes in the query system.

Continuing with the discussion of FIG. 2, after configuration of the query system (e.g., using the method shown in FIG. 2), the query system may service query requests in accordance with FIGS. 3A-3C.

FIGS. 3A-3C show flowcharts for recursively servicing a query request from a client in accordance with one or more embodiments of the invention. All or a portion of the method shown in FIGS. 3A-3C may be performed by one or more of the query nodes. Further, different sets of query nodes in the query system may be concurrently servicing different query requests using the method described in FIGS. 3A-3C.

The method shown in FIG. 3A is from the perspective of the query node that received the query request from a client or the subscription engine. The method shown in FIG. 3B is from the perspective of a query node, which may or may not be query node that received the query request. FIG. 3C is from the perspective of other query nodes in the system that assisting in servicing the query request but that did not receive the initial query request from the client or the subscription engine.

Turning to FIG. 3A, in Step 300, a query request is received by the query node. The query request may specify a specific sub-region (referred to as the target sub-region). In this context, the data in the target sub-region corresponds to the data that is being requested via the query request. The query request may, but is not required to, specify a particular version of user data (which may be different per user data) to use to service the query request. If no version of user data is specified (or new version is specified for particular user data), then the query request may use the current version (or the newest version) of such user data to service the query request. The query request may be issued by an entity, where the entity may be client or the subscription engine.

In Step 302, the user data sub-region(s) for the query are determined. More specifically, the data flow graph may be analyzed to determine the underlying user data region(s) that are required to ultimately calculate the data in the target sub-region.

In Step 304, the revisions map for the user data sub-regions is obtained. In one embodiment of the invention, the query node may issue a revisions map request, which specifies the user data sub-regions, to the DBMS (see e.g., FIG. 1A, 108). In response to the request, the DBMS obtains and subsequently provides the revisions map to the query node. The revisions map, as discussed above, specifies a version number (or other identifier) for each user data sub-region.

In one embodiment of the invention, the query node may issue a revisions map request, which specifies the user data sub-regions and some other criteria, to the DBMS (see e.g., FIG. 1A, 108). The criteria may specify a time, date, or other criterion that may be used to identify a specific version of one or more user data sub-regions. For example, the revisions map request may specify "January 2018" for user-data sub-region A. In response to the request, the DBMS obtains and subsequently provides the revisions map to the query node, where the revisions map specifies a version number for user data sub-region A that corresponds to January 2018. The above example is not intended to limit the scope of the invention.

In Step 306, the input sub-regions for the target sub-region are determined. The input sub-regions correspond to sub-regions, as specified in the data flow graph, which include data (which may be derived data or user data) that is used as input to the target sub-region.

In Step 308, the data is obtained from each of the identified input sub-regions (see e.g., FIG. 3B). The data may be obtained from the cache in the query node, from persistent storage, or from another query node.

In Step 310, one or more functions (e.g., mathematical functions or algorithms) are applied to the data obtained in step 308 is to generate data for the target sub-region. The resulting data is then used to generate a query response, where the query response may include the data associated with the target sub-region.

In Step 312, the query response is provided to entity that issued the query request or to another entity. For example, the query response may be issued to the client that initiated the query request, to the subscription engine that initiated the query request, or to a client where the query request was issued by the subscription engine for the client.

Referring to FIG. 3B, FIG. 3B shows a method for obtaining data from the input sub-regions identified in Step 306. The method shown in FIG. 3B is performed (concurrently, serially, or some combination thereof) for all of the input sub-regions identified in Step 306 or step 352 (below).

Turning to FIG. 3B, in Step 320, an input sub-region is selected. In Step 322, the query node that is managing the selected input sub-region is determined using the node distribution key list on the query node (which may the global distribution key list if the query node is the leader query node). In one embodiment of the invention, the outer dimension(s) of the input sub-region are used as input to a function (e.g., a consistent hashing function) to determine a distribution key for the input sub-region. The node distribution key list on the query node is then queried with the distribution key to identify the query node that is managing the input sub-region.

In Step 324, a determination is made about whether the query node identified in step 322 is the current query node (i.e., the query node that performed step 322). If the query node identified in step 322 is the current query node, then the process proceeds to step 330; otherwise, the current query node is not managing the input sub-region and, as such, the process proceeds to step 326.

In Step 326, the current query node issues a query request to the query node with is identified in step 322. Once the query request is issued, the current query node waits until it receives a response (in step 328) from the query node to which it issued a query request. The query request issued in step 326 specifies the input sub-region and the revisions map (i.e., the revisions map from step 304) (or a portion thereof).

In Step 328, a response to the query request is received, where the response includes the data associated with the selected input sub-region. If the data for the input sub-region is user data, then the received data corresponds to the user data version specified in the revisions map (e.g., if the revisions map specified version 2 of user data for the input sub-region, then the received data is version 2 of the user data) (or a portion thereof). If the data for the input sub-region is derived data, then the received data corresponds to the derived data that is directly or indirectly generated using the user data version specified in the revisions map (e.g., if the revisions map specified version 2 of user data for the input sub-region, then the received data is directly or indirectly derived from version 2 of the user data) (or a portion thereof). The data obtained via the query response may be stored in the cache of the query node along with the corresponding revisions map (or portion thereof). The process then ends.

Referring back from Step 324, if the query node identified in step 322 is the current query node, then in Step 330 a determination is made about whether the correct version of the data associated with the input sub-region is present in the cache. As discussed above, the cache may store multiple versions of data (which may be user data or derived data) for a given sub-region, where each version is associated with a revisions map. Accordingly, the determination in step 330 is whether: (i) there are any versions of the data associated with the input sub-region in the cache and (ii) if so, is any version of these versions of data associated with a revisions map that matches the revisions map determined in step 304. If so, then the correct version of the data associated with the input sub-region is present in the cache and the process proceeds to step 332; otherwise, the process proceeds to step 334.

In Step 332, the correct version of the data associated with the input sub-region is obtained from the cache. The process then ends.

Referred back to Step 330, if the correct version of the data associated with the input sub-region is not present in the cache, then in Step 334 a determination is made about whether the data for the selected input region is user data or derived data. If the data for the selected input region is user data, then the process proceeds to step 336; otherwise, the process proceeds to step 326.

In Step 336, the correct version of the data associated with the input sub-region is obtained from the persistent storage. The data obtained from the persistent storage may be stored in the cache of the query node along with the corresponding revisions map (or portion thereof). The process then ends.

Referring to FIG. 3C, FIG. 3C shows a method for servicing inter-query node query requests (i.e., query requests issued in Step 326).

Turning to Step 340, in step 340, a query request is received by a query node from another query node.

In Step 342, a determination is made about whether the correct version of the data associated with the input sub-region is present in the cache. As discussed above, the cache may store multiple versions of data for given sub-region, where each version is associated with a revisions map. Accordingly, the determination in step 342 is whether: (i) there are any versions of the data associated with the input sub-region in the cache and (ii) if so, is any version of these versions of data associated with a revisions map that matches the revisions map determined in step 304. If so, then the correct version of the data associated with the input sub-region is present in the cache and the process proceeds to step 344; otherwise, the process proceeds to step 346.

In Step 344, the correct version of the data associated with the input sub-region is obtained from the cache and then sent back, via a query response, to the query node that issued the query request received in step 340. The process then ends.

Referred back to Step 342, if the correct version of the data associated with the input sub-region is not present in the cache, then in Step 346 a determination is made about whether the data for the selected input region is user data or derived data. If the data for the selected input region is user data, then the process proceeds to step 348; otherwise, the process proceeds to step 350.

In Step 348, the correct version of the data associated with the input sub-region is obtained from the persistent storage and then sent back, via a query response, to the query node that issued the query request received in step 340. The data obtained from the persistent storage may be stored in the cache of the query node along with the corresponding revisions map (or portion thereof). The process then ends.

If the data is derived data, then in Step 350, a subsequent input sub-region(s) is determined for the input sub-region specified in the query request obtained in step 340. The subsequent input sub-region corresponds to the sub-region(s), as specified in the data flow graph, which includes data (which may be derived data or user data) that is used an input into the input sub-region. The process then proceeds to step 352.

In Step 352, the data is obtained from each of the identified subsequent input sub-regions (see e.g., FIG. 3B). The data may be obtained from the cache in the query node, from persistent storage, or from another query node. The process then proceeds to step 354.

In Step 354, a query response is generated using the data obtained in steps 352. The query response is then issued to the query node that issue the query request received in step 340.

Example

Figure 4A:
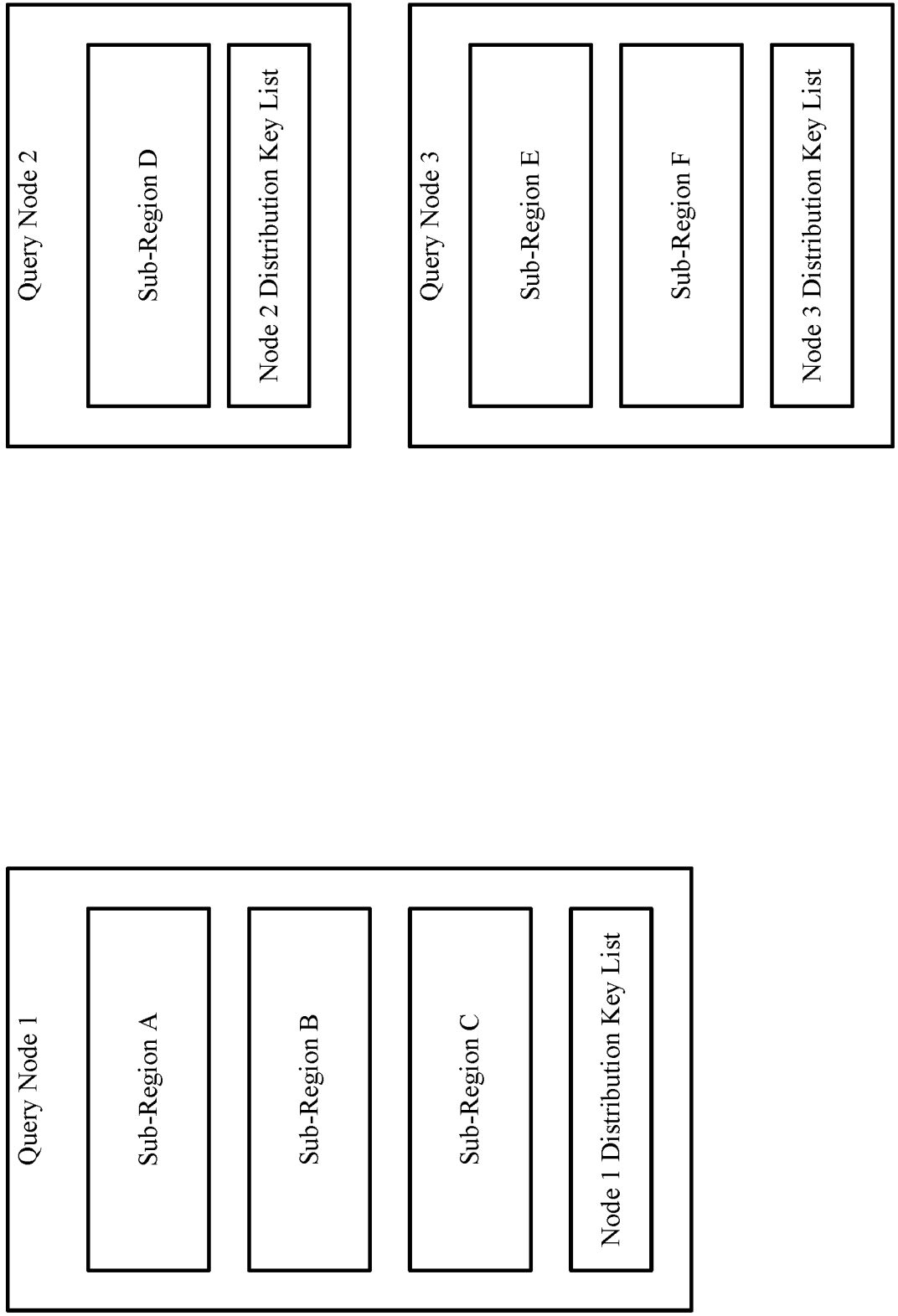
FIGS. 4A-4C shows an example in accordance with one or more embodiments of the invention.
Figure 4B:
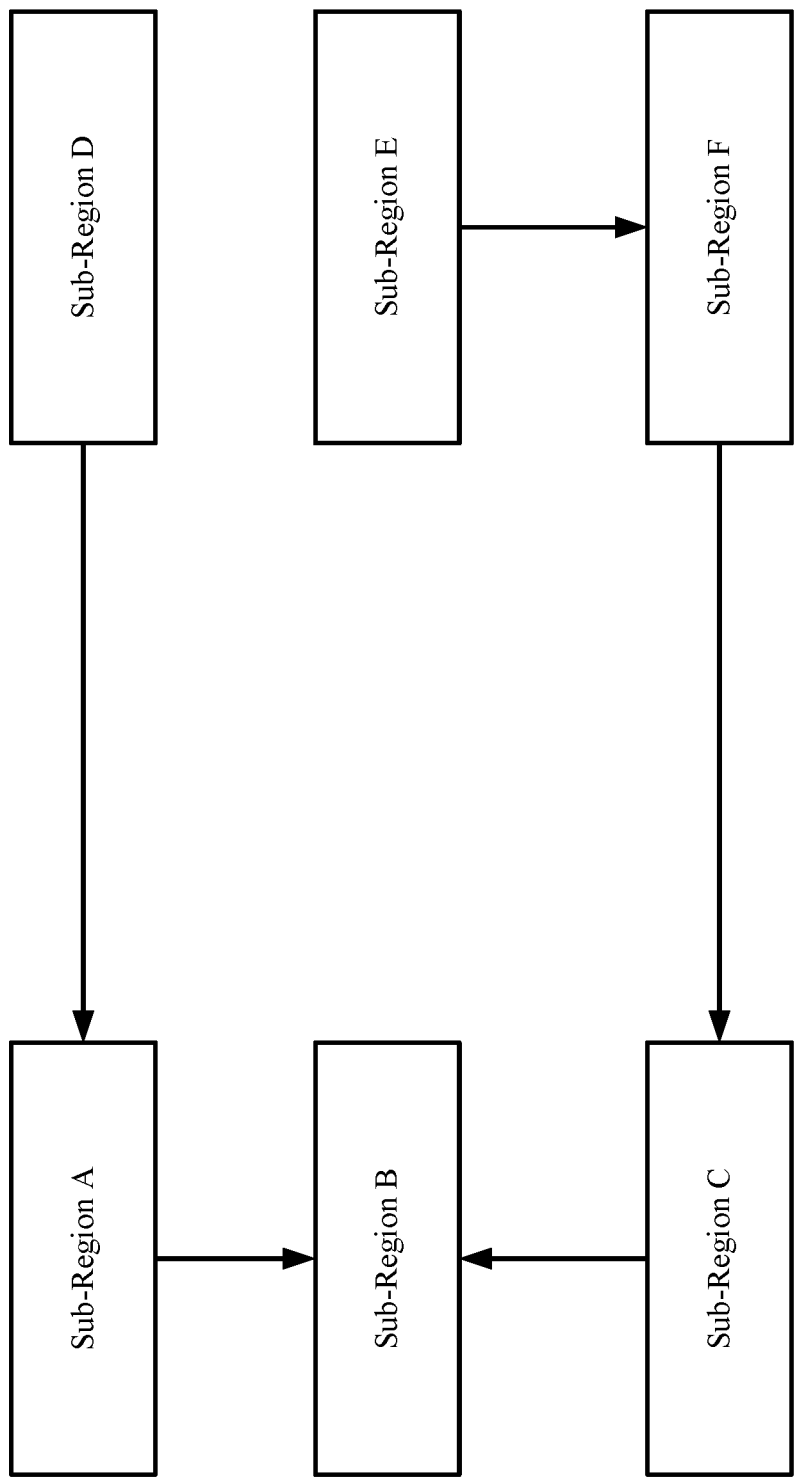
Figure 4C:
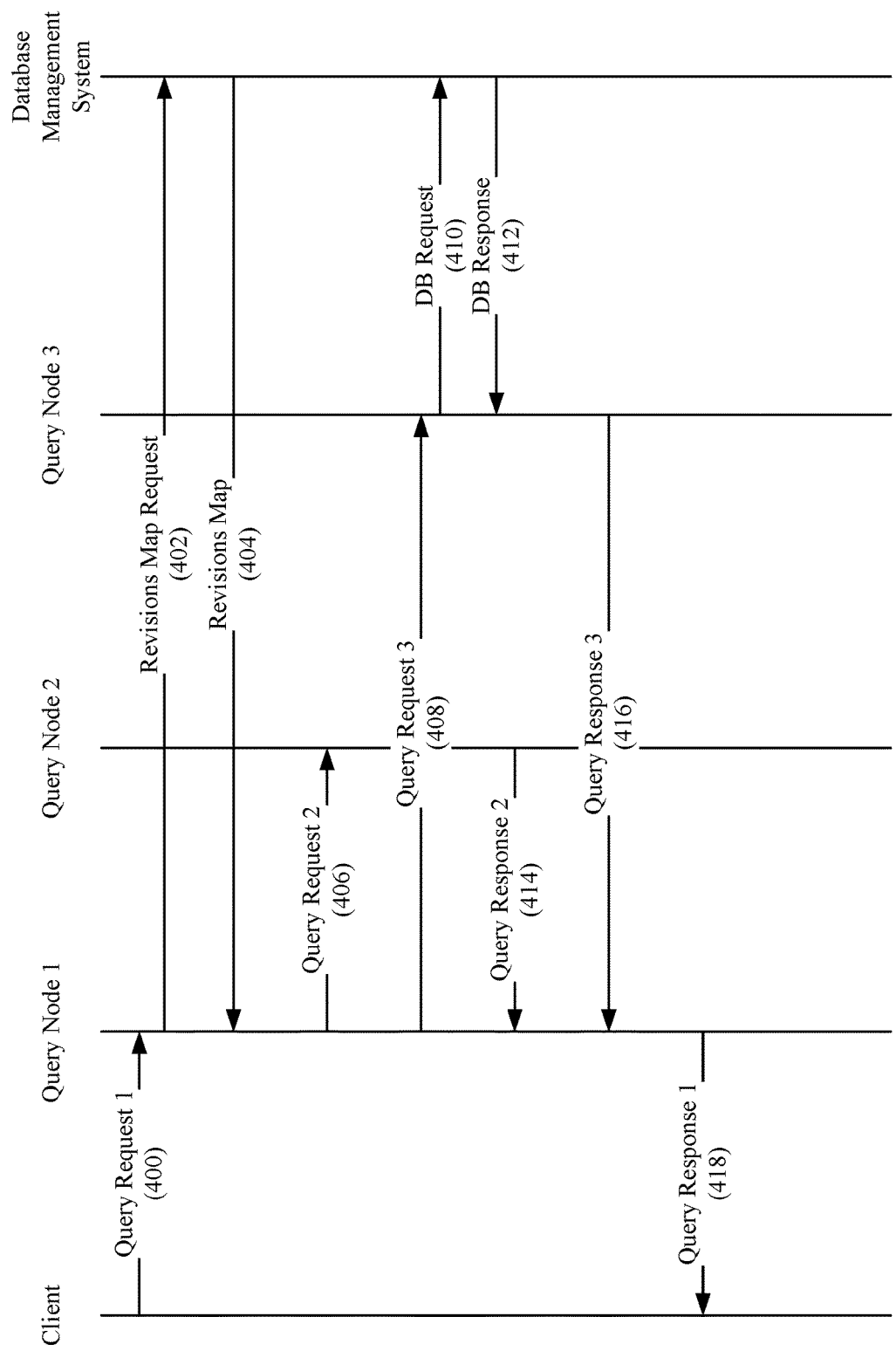

FIGS. 4A-4C shows an example in accordance with one or more embodiments of the invention. The following example is used to illustrate the servicing of a query request in accordance with FIGS. 3A-3C but is not intended to limit the scope of the invention.

Referring to FIG. 4A, consider a scenario in which the query system includes three query nodes, namely, query node 1, query node 2, and query node 3. Further, the data model is divided, in accordance with the method shown in FIG. 2, into six sub-regions, namely, sub-region A (SRA), sub-region B (SRB), sub-region C (SRC), sub-region D (SRD), sub-region E (SRE), and sub-region F (SRF). In this example, the sub-regions are distributed across the query nodes as follows: query node 1 manages SRA, SRB, and SRC; query node 2 manages SRD, and query node 3 manages SRE, and SRF. Each of the query nodes includes its own node distribution key list, which specifies which query node manages each of the aforementioned sub-regions.

Referring to FIG. 4B, FIG. 4B shows a data flow graph depicting the relationship between the aforementioned sub-regions. Specifically, in this example, SRA, SRB, SRC, and SRF are sub-regions that include derived data while sub-regions SRD and SRE include user data. Further, the input sub-region for SRF is SRE, the input sub-region for SRA is SRD, the input sub-region for SRC is SRF, and the input sub-regions for SRB are SRA and SRC.

Referring to FIG. 4C, consider a scenario in which a client issues query request 1 (400) to query node 1. Query request 1 specifies a target sub-region as SRB but does not specify any specific version of user data to use for servicing the query request. Accordingly, recent version (which may be the most current version) of user data is used as, in this example, the default version of user data is used when no specific version of the user data is specified.

Query node 1, using the data flow graph (see e.g., FIG. 4B) determines that the user data sub-regions associated with SRB are SRD and SRE. In response to this determination, query node 1 issues a revisions map request (402) to the Database Management System (DBMS) for the current version of user data associated with SRD and SRE. The DBMS provides a revisions map (404) in response to the revisions map request, the revisions map (404) specifies the following [SRDv3, SREv1].

Query node 1 then determines that the input sub-regions for SRB are SRA and SRC. For SRA, the query node determines that SRA is managed by query node 1 using the node 1 distribution key list and a distribution key for SRA. As SRA is managed by query node 1, the cache on query node 1 is searched to determine whether it includes data for SRA that is associated with SRDv3. In this example, the cache does not include this data. Accordingly, query node 1 subsequently determines that the input sub-region for SRA is SRD. In response to this determination, query node 1 calculates a distribution key for SRD using the outer dimension of SRD. The node 1 distribution key list in combination with the distribution key for SRD is used to identify that query node 2 manages SRD. Accordingly, query node 1 issues query request 2 (406) to query node 2 for the data in SRD associated with SRDv3.

For SRC, the query node 2 determines that SRC is managed by query node 1 using the node 1 distribution key list and a distribution key for SRC. As SRC is managed by query node 1, the cache on query node 2 is searched to determine whether it includes data for SRC that is associated with SREv1. In this example, the cache does not include this data. Accordingly, query node 1 subsequently determines that the input sub-region for SRC is SRF. In response this determinations, query node 2 calculates a distribution key for SRF using the outer dimension of SRF. The node 2 distribution key list in combination with the distribution key for SRF is used to identify that query node 3 manages SRF. Accordingly, query node 2 issues query request 3 (408) to query node 3 for the data in SRF associated with SREv1.

Query node 3 subsequently receives query request 3 (408). Query node 3 determines that the cache on query node 3 does not include data for SRF that is associated with SREv1 and that the input sub-region for SRF is SRE. In response to the two aforementioned determinations, query node 3 calculates a distribution key for SRE using the outer dimension of SRE. The node 3 distribution key list in combination with the distribution key for SRE is used to identify that query node 3 manages SRE.

Based on this determination, query node 3 searches the cache on query node 3 to determine whether data for SRE associated with SREv1 is present in the cache. In this example, the data for SRE associated with SREv1 is not present in the cache and, as a result, query node 3 issues a DB request (410) to the DBMS which includes revisions map [SREv1]. A DBMS response (412) with the data for SRE associated with [SREv1] is received from the DBMS. The received data along with the following revisions map [SREv1] is stored in the cache on query node 3.

At some later point in time, query node 2 obtains data for SRD associated with SREv1 from its cache and transmits the data (via query response 2 (414)) to query node 1. Further, query node 3 generates data for SRF using the data for SRE associated with [SREv1] and transmits the generated data (via query response 3 (416)) to query node 1.

Upon receipt of query response 2, query node 1 generates data for SRA using the data for SRD associated with [SRDv3] and upon receipt of query response 3, query node 1 generates data for SRC using the data for SRF associated with [SREv1]. The newly generated data for SRA (with an association to SRDv3) and SRC (with an association to SREv1) is cached in query node 1.

Finally, the generated data for SRA and SRC is used to generate the data for SRB. The resulting data for SRB is then transmitted to the client via query response 1. SRB is also cached and associated with [SRDv3, SREv1].

End of Example

Figure 5:
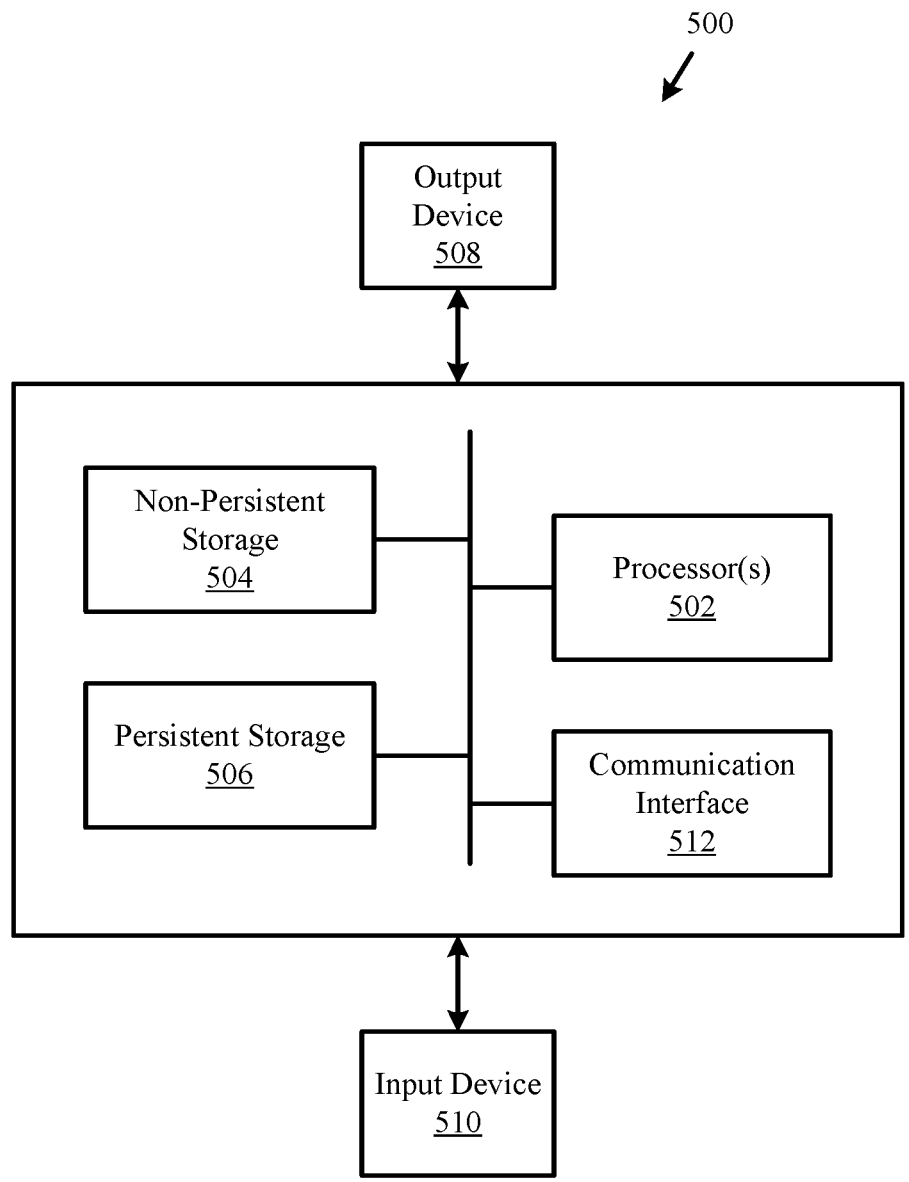
FIG. 5 shows a diagram of a computing device in accordance with one or more embodiments of the invention.

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506).

Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

Embodiments of the invention may improve data processing technology for very large data sets. Specifically, embodiments of the invention may improve the processing by, example: (i) only requiring user data to be stored in persistent storage as opposed to requiring all derived data to be stored in persistent storage thereby reducing the amount of persistent storage required to implement the query system; (ii) implementing a query system that only requires derived data to be calculated in response to a query request as instead of updating the derived data each time there is an updated to any user data thereby reducing the computing overhead required in query systems in which user data is frequently updated; and (iii) by using strong versioning and a data flow graph that specifies the relationships between sub-regions, a consistent query result may be generated for a given target region using a specific revisions map.

The improvement to the data processing technology by various embodiments of the invention discussed above should be understood as being examples of improvements to the technology and should not be limit the invention is any manner.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for servicing query requests, comprising:
   determining, by a first query node and in response to a first query request, a user data sub-region and a target sub-region associated with the first query request,
   wherein determining the user data sub-region associated with the query request comprising using a data flow graph,
   wherein the data flow graph is associated with a data model and specifies relationships between a plurality of sub-regions in the data model, and
   wherein the user data sub-region is one of the plurality of sub-regions;
   issuing a revisions map request to a database management system;
   obtaining, in response to the revisions map request, a revisions map, wherein the revisions map specifies a version of user data associated with the user data sub-region to use to service the query request, wherein the version of user data is one of a plurality of versions of user data;
   identifying, using the data flow graph, a first input sub-region of the target sub-region;
   identifying a second query node associated with the first input sub-region, wherein the second query node is a physical computing device or a logical computing device;
   issuing a second query request to the second query node to obtain data associated with the first input sub-region;
   receiving, by the second query node, the second query request, wherein the second query request comprises the revisions map;
   making a first determination that data stored in a cache on the second query node is associated with the first input sub-region and is not associated with the version of the user data specified in the revisions man;
   based on the first determination, making a second determination that the data associated with the first input sub-region is the user data;
   based on the second determination, obtaining the user data associated with the first input sub-region from a persistent storage;
   sending the second query result to the first query node, wherein the second query result comprises the user data obtained from the persistent storage;
   receiving, in response to the second query request, a second query result from the second query node, wherein the second query result is based on the version of the user data;
   generating a first query result for the target sub-region using at least the second query result; and
   providing the first query result to an entity associated with the issuance of the first query request.

2. The method of claim 1, further comprising:
   receiving, by the second query node, the second query request, wherein the second query request comprises the revisions map;
   determining that data stored in a cache on the second query node is associated with the first input sub-region and with the version of the user data specified in the revisions map; and
   based on the determination, sending the second query result to the first query node, wherein the second query result comprises at least a portion of the data stored in the cache.

3. The method of claim 2, wherein the data stored in the cache is derived data.

4. The method of claim 1, further comprising:
   receiving, by the second query node, the second query request;
   identifying, using the data flow graph, a second input sub-region of the first input sub-region;
   identifying a third query node associated with the second input sub-region;
   issuing a third query request to the third query node to obtain data associated with the second input sub-region;
   receiving a third query response from the third query node;
   determining a value for at least one cell in the first input sub-region using the third query response; and
   sending the second query result to the first query node, wherein the second query result comprises the value.

5. The method of claim 1, wherein the version of user data is a most recent version of user data.

6. The method of claim 1, wherein identifying the second query node associated with the first input sub-region comprises:
    determining a distribution key using an outer dimension associated with the first input sub-region;
    identifying the second query node using the distribution key and a node distribution key list.

7. The method of claim 6, wherein the distribution key is a value generated using consistent hashing.

8. The method of claim 6, wherein the second query node is a lead query node and wherein the second query node distributes updates to the node distribution key list to the first query node.

9. The method of claim 1, wherein the entity is one selected from a group consisting of a client and a subscription engine.

10. The method of claim 1, wherein the first query request is issued in response to a subscription engine receiving a notification that user data associated with the target sub-region has changed.

11. The method of claim 1, wherein the data flow graph comprises at least one cycle.

12. The method of claim 1, wherein the first query node comprises the target sub-region and a second sub-region, wherein each cell in the target sub-region and the second sub-region are associated with the same outer dimension.

13. A non-transitory computer readable medium comprising computer readable program code, which when executed by a computer processor enables the computer processor to perform a method for servicing query requests, the method comprising:
    determining, by a first query node and in response to a first query request, a user data sub-region and a target sub-region associated with the first query request,
    wherein determining the user data sub-region associated with the query request comprising using a data flow graph,
    wherein the data flow graph is associated with a data model and specifies relationships between a plurality of sub-regions in the data model, and
    wherein the user data sub-region is one of the plurality of sub-regions;
    issuing a revisions map request to a database management system;
    obtaining, in response to the revisions map request, a revisions map, wherein the revisions map specifies a version of user data associated with the user data sub-region to use to service the query request, wherein the version of user data is one of a plurality of versions of user data;
    identifying, using the data flow graph, a first input sub-region of the target sub-region;
    identifying a second query node associated with the first input sub-region;
    issuing a second query request to the second query node to obtain data associated with the first input sub-region, wherein the second query node is a physical computing device or a logical computing device;
    receiving, by the second query node, the second query request, wherein the second query request comprises the revisions map;
    making a first determination that data stored in a cache on the second query node is associated with the first input sub-region and is not associated with the version of the user data specified in the revisions map;
    based on the first determination, making a second determination that the data associated with the first input sub-region is the user data;
    based on the second determination, obtaining the user data associated with the first input sub-region from a persistent storage;
    sending the second query result to a first query node, wherein the second query result comprises the user data obtained from the persistent storage;
    receiving, in response to the second query request, a second query result from the second query node, wherein the second query result is based on the version of the user data;
    generating a first query result for the target sub-region using at least the second query result; and
    providing the first query result to an entity associated with the issuance of the first query request.

14. The non-transitory computer readable medium of claim 13, wherein the method further comprises:
    receiving, by the second query node, the second query request, wherein the second query request comprises the revisions map;
    determining that data stored in a cache on the second query node is associated with the first input sub-region and with the version of the user data specified in the revisions map; and
    based on the determination, sending the second query result to the first query node, wherein the second query result comprises at least a portion of the data stored in the cache.

15. The non-transitory computer readable medium of claim 13, wherein identifying the second query node associated with the first input sub-region comprises:
    determining a distribution key using an outer dimension associated with the first input sub-region; and
    identifying the second query node using the distribution key and a node distribution key list,
    wherein the distribution key is a value generated using consistent hashing.

* * * * *